Patented July 15, 1924.                                       1,501,242

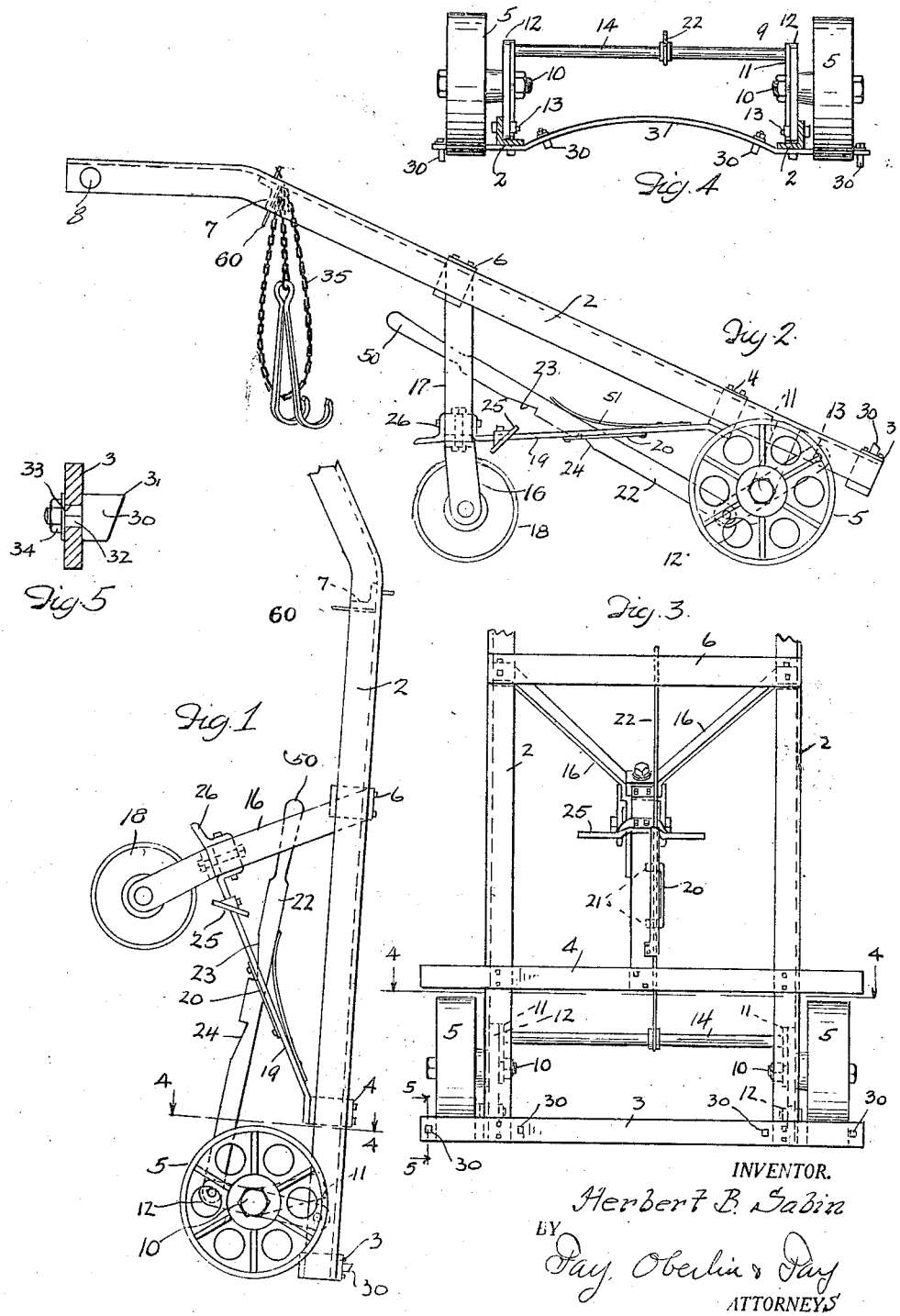

UNITED STATES PATENT OFFICE.

HERBERT B. SABIN, OF CLEVELAND, OHIO.

HAND TRUCK.

Application filed February 27, 1922. Serial No. 539,469.

*To all whom it may concern:*

Be it known that I, HERBERT B. SABIN, a citizen of the United States, and a resident of Cleveland, county of Cuyahoga, and State of Ohio, have invented a new and useful Improvement in Hand Trucks, of which the following is a specification, the principle of the invention being herein explained and the best mode in which I have contemplated applying that principle, so as to distinguish it from other inventions.

The present invention relates to hand operated trucks of the type suitable for general use in warehouses, factories and like places for handling barrels, boxes, drums and the like, and the present truck is of the same general type as those shown in my issued Letters Patent No. 1,358,881 and No. 1,438,334 and in my copending application for United States Letters Patent Serial No. 539,470 filed February 27, 1922.

The present type of truck is adapted to be moved adjacent a container to which it may be attached so that the container may be lifted by the tilting of the truck. The container does not have to be tilted by hand but is clutched or held so securely against the truck that the tilting of the truck accomplishes the lifting of the container. This lifting is obtained by tilting the truck over its lower edge and the wheels are pivotally mounted so as to move rearwardly through a predetermined arc to allow the container to be tilted considerably before any lifting action takes place, thus allowing heavy loads to be easily handled by a single operator. Another feature is the addition of a third wheel or caster which is so connected to the truck as to carry the load when the truck has been tilted to its normal load carrying position. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a side elevational view of the truck in the position in which it is placed against a container; Fig. 2 is a side elevational view showing the truck in its carrying or moving position; Figs. 3 and 4 are sectional views on the lines 3—3 and 4—4 of Figs. 1 and 3 respectively; and Fig. 5 is a view of a detail showing a holding lug.

As shown, the present truck comprises a frame having two upwardly extending side members 2 connected by cross members, the lowest cross member 3 being secured to the lower ends of the side members, while the next cross member 4 is mounted on the side members preferably just above the wheels 5. A third cross member 6 is used which is preferably mounted about half way up the side members while a fourth cross member 7 is mounted near the top of the side members, the side members being bent just beyond this member in order to lower the ends thereof which are provided with handles 8.

The wheels 5 are carried by a base 9 which comprises stub shafts 10 on which the wheels are mounted, the shafts being carried by brackets 11 mounted on arms 12 which are pivotally attached to the side frames at 13. These arms extend beyond the stub shafts and are provided with a cross rod 14 near the lower free ends. Thus this base 9 and the wheels may rock relatively to the frame and the two lower cross members 3 and 4 extend beyond the wheels as shown in Figure 3.

At approximately the cross member 6 the side members are provided with downwardly and inwardly extending caster bracket legs 16 which are secured to the caster bracket 17 carrying a suitable swivel mounted caster wheel 18. To more securely position the bracket and wheel a forwardly extending supporting bar 19 is employed which is bolted or otherwise securely attached at one end to the bracket 17 and at its other end to the cross member 4, thus forming a rigid three point support for the caster bracket and wheel.

This bar 19 is provided wih a spaced locking strip 20 having its ends 21 riveted or otherwise rigidly secured to the bar and a notched adjusting bar 22 is pivotally mounted on the cross rod 14 and extends through this spaced strip, the notches 23 and 24 which engage with one end 21 to hold the truck in the positions shown in Figs. 1 and 2. This bar has a handle 50 extending beyond the legs 16. Mounted on the bar 19 is a foot support or pedal 25 or a pedal 26 may be attached to the bracket 17 and extend rearwardly of the same.

By means of the pivotal mounting of the wheels and the adjusting bar, the truck may be stood on end as shown in Fig. 1 with the frame members slightly beyond the vertical and with the wheels touching the floor and forming with the lower cross member a support for the truck. When the truck is secured to the container the handle 50 is moved to release the adjusting bar and thus the base and wheels so that the truck may be tilted over its lower edge without lifting the container off the floor until the truck has tilted sufficiently to shift considerable weight over the wheels making it easier to tilt the truck to the moving position shown in Fig. 2. As the wheels reach the position shown in Fig. 2 the notch 24 engages, preventing rocking of the wheels during movement, the bar being maintained in position by a flat spring 51 attached to the bar 19 and pressing against the adjusting bar 22.

The present truck is more particularly adapted to the handling of wooden containers such as barrels or boxes and the lower three cross bars, 3, 4, and 6, are curved slightly to hold barrels or the like but the extending ends of the lower two cross members are straight to support boxes. To fasten the box or other container in position the lower cross member is supplied with a plurality of sharpened lugs 30 which are removably mounted in the cross member as best shown in detail in Fig. 5. Each of these lugs have a sharpened end 31 and a squared shank 32 mounted in a complementary formed socket 33 in the cross member, the rear end beyond the shank being threaded to receive a nut 34 to hold the lug in place. As shown in Fig. 3, there are four such lugs 30, the outer two being near the ends of the lower cross member beyond the outer wheel line, while the inner two are within the curved area of the cross member and thus adapted for use with barrels.

Attached to the upper cross member is a chain 35 which is provided with a double hook at one end adapted to be thrown over and hooked onto the container, the chain being then drawn tight and hooked into a slotted locking strip 60 secured to the upper cross bar. This is done while the truck is in the position shown in Fig. 1. The operator then grasps the handles 8 and by stepping on the foot pedal, tilts the truck rearwardly until the truck with the container thereon reaches its traveling position resting on the three wheels. The handles are then in the best position for pushing the truck and the truck with a normal load is just slightly over balanced so that the caster wheel is carrying a part of the load. The amount of bend in the handles is dependent upon the overall height of the truck and is sufficient to bring the handles into a position to make it easy to handle and move the truck about.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a truck the combination of a frame comprising side members and cross members having handles, a base provided with wheels, said base being pivotally attached to said frame adjacent its lower end, means on said frame for securing a container thereto, and cooperating means on said frame and base for locking the same together in two positions to allow said truck to stand upright and to allow said truck to be tilted over the end of said frame to shift the weight over said wheels before lifting the container.

2. In a truck the combination of a frame comprising side members and cross members and having handles, a base provided with wheels, said base being pivotally attached to said frame adjacent its lower end, means on said frame for securing a container thereto, a caster wheel bracket carried by said frame and having a caster wheel and a notched adjusting bar pivotally connected to said base and adapted to engage with said caster wheel bracket to lock said base and wheels in two positions relative to said frame to allow said truck to stand upright and to allow said truck to be tilted over the end of said frame to shift the weight over said wheels before lifting the container.

3. In a truck the combination of a frame comprising side member and cross members and having handles, a base provided with wheels, said base being pivotally attached to said frame adjacent its lower end, means on said truck for securing a container against said frame, a caster wheel bracket and wheel rigidly attached to said frame and extending downwardly and adapted to support said frame in its carrying position, and means on said base adapted to interlock with said bracket to secure said base in either of two positions relative to said frame to allow said truck to stand upright and to allow said truck to be tilted over the end of said frame to shift the weight over said wheels before lifting the container.

4. In a truck the combination of a frame comprising side and cross members and having handles, a base provided with wheels, said base being pivotally attached to said frame, means on said truck for securing a container against said frame, a caster bracket provided with a caster wheel mounted on bracket legs rigidly secured to said frame, a bar connecting said caster bracket and one of the frame cross members, and a notched rod pivotally attached to said base and adapted to interlock with said bar in either of two positions to allow said frame and truck to stand upright or to allow said truck to tilt rearwardly to shift the load over said wheels and base before lifting said load and bringing the load on said base wheels and caster wheel.

5. In a truck, the combination of a frame comprising side and cross members and having handles, a base consisting of two arms pivotally attached at one end to said side frame members and provided with stub shafts carrying wheels, said arms being connected by a cross rod, legs rigidly secured to said frame, a caster bracket mounted on said legs, a bar connecting said legs and bracket, said bar having a spaced locking strip, and a notched adjusting bar pivotally mounted on said base cross rod and extending through such spaced locking strip and adapted to be engaged therewith in either the upright position of said truck or in its carrying position in order to distribute the load on both said base wheels and said caster wheel.

Signed by me, this 21st day of February, 1922.

HERBERT B. SABIN.